(12) United States Patent
Woo et al.

(10) Patent No.: US 12,246,573 B2
(45) Date of Patent: Mar. 11, 2025

(54) SUSPENSION APPARATUS FOR VEHICLE

(71) Applicant: HYUNDAI MOBIS CO., LTD., Seoul (KR)

(72) Inventors: Hyun Jin Woo, Yongin-si (KR); Hye Chan Park, Yongin-si (KR); Jong Mook Park, Yongin-si (KR); Ho Youn Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/414,735

(22) Filed: Jan. 17, 2024

(65) Prior Publication Data

US 2024/0416709 A1 Dec. 19, 2024

(30) Foreign Application Priority Data

Jun. 14, 2023 (KR) ........................ 10-2023-0076178

(51) Int. Cl.
*B60G 21/05* (2006.01)
*B60G 7/00* (2006.01)

(52) U.S. Cl.
CPC ........... *B60G 21/052* (2013.01); *B60G 7/008* (2013.01); *B60G 2200/21* (2013.01); *B60G 2202/12* (2013.01); *B60G 2204/129* (2013.01); *B60G 2204/4307* (2013.01)

(58) Field of Classification Search
CPC .... B60G 21/05; B60G 21/051; B60G 21/052; B60G 2200/21; B60G 2204/124; B60G 2204/129; B60G 2204/149; B60G 2204/4306; B60G 2204/4307; B60G 2206/20; B60G 2206/203; B60G 2202/12; B60G 7/008
See application file for complete search history.

(56) References Cited

U.S. PATENT DOCUMENTS

| | | | | |
|---|---|---|---|---|
| 5,409,254 | A * | 4/1995 | Minor | B60G 11/50 280/124.179 |
| 5,851,016 | A * | 12/1998 | Kawagoe | B60G 13/003 280/124.135 |
| 6,196,564 | B1 * | 3/2001 | Hawener | B60G 7/04 280/124.179 |
| 7,556,272 | B2 * | 7/2009 | Marchel | B60G 21/051 280/124.128 |
| 7,866,640 | B2 * | 1/2011 | Funano | B60G 21/052 267/293 |

(Continued)

FOREIGN PATENT DOCUMENTS

| | | | | |
|---|---|---|---|---|
| JP | 11078461 | A * | 3/1999 | ........... B60G 21/051 |
| JP | 2001080329 | A * | 3/2001 | ........... B60G 21/051 |

(Continued)

*Primary Examiner* — Laura Freedman
(74) *Attorney, Agent, or Firm* — Morgan, Lewis & Bockius LLP

(57) ABSTRACT

The present disclosure relates to a suspension apparatus for a vehicle, the suspension apparatus including an axle carrier to which a wheel is rotatably coupled, a torsion beam axle having a trailing arm coupled to the axle carrier, the torsion beam axle being disposed in a width direction of a vehicle, a spring lower pad coupled to the axle carrier and having a bump stopper, a spring seated on the spring lower pad, and a shock absorber coupled to the axle carrier and disposed to be inclined toward a rear side of the vehicle.

10 Claims, 4 Drawing Sheets

(56) References Cited

U.S. PATENT DOCUMENTS

| | | | | |
|---|---|---|---|---|
| 7,871,093 B2* | 1/2011 | Ogawa | .................... | B60G 7/00 |
| | | | | 280/124.128 |
| 7,891,674 B2* | 2/2011 | Vaxelaire | .............. | B60G 7/001 |
| | | | | 280/86.758 |
| 7,958,979 B2* | 6/2011 | Sekiya | ................ | B60G 21/051 |
| | | | | 188/267.2 |
| 8,047,617 B2* | 11/2011 | Riffier | ................ | B60G 21/051 |
| | | | | 301/124.1 |
| 8,210,508 B2* | 7/2012 | Hwang | ................ | F16F 1/3732 |
| | | | | 267/153 |
| 9,315,085 B1* | 4/2016 | Riley | .................... | B62D 65/12 |
| 9,375,992 B2* | 6/2016 | Lee | ...................... | B60G 21/052 |
| 9,463,676 B2* | 10/2016 | Yamamotoya | ......... | B60G 15/06 |
| 9,610,820 B1* | 4/2017 | Chen | .................... | B60G 7/001 |
| 10,471,793 B2* | 11/2019 | Kueppers | .............. | B60G 21/051 |
| 10,632,808 B2* | 4/2020 | Holtheide | .............. | B60G 7/008 |
| 10,899,388 B2* | 1/2021 | Nishida | ................ | B60G 21/007 |
| 11,827,067 B1* | 11/2023 | Jung | .................... | B60G 21/051 |
| 2011/0248465 A1* | 10/2011 | Carlitz | .................... | B60G 9/00 |
| | | | | 280/124.164 |
| 2024/0075786 A1* | 3/2024 | Hirai | .................... | B60G 21/052 |

FOREIGN PATENT DOCUMENTS

| | | | | | |
|---|---|---|---|---|---|
| JP | 2004034866 | A | * | 2/2004 | ........... B60G 21/051 |
| KR | 20010057647 | A | * | 7/2001 | |
| KR | 20040099783 | A | * | 12/2004 | |
| KR | 20060069709 | A | * | 6/2006 | |
| KR | 20070066318 | A | * | 6/2007 | |
| KR | 100836392 | B1 | * | 6/2008 | |
| KR | 20100038994 | A | * | 4/2010 | |
| KR | 10-2022-0162460 | A | | 12/2022 | |

* cited by examiner

SUSPENSION APPARATUS FOR VEHICLE

CROSS-REFERENCE TO RELATED APPLICATION

This application claims the benefit under 35 U.S.C. § 119(a) of priority to Korean Patent Application No. 10-2023-0076178, filed on Jun. 14, 2023 in the Korean Intellectual Property Office, the entire disclosure of which is incorporated herein by reference for all purposes.

BACKGROUND

Field

Exemplary embodiments of the present disclosure relate to a suspension apparatus for a vehicle, and more particularly, to a suspension apparatus for a vehicle, which is capable of designing a vehicle with a low height.

Discussion of the Related Art

The use of vehicles around the world is being changed to a means for expanding a living space instead of a means of transportation. Therefore, a purpose-built vehicle (PBV) with a large interior space is in the limelight.

Vehicle internal spaces of the PBVs need to be variously utilized depending on the purpose desired by users. Therefore, there is a need to design a vehicle with a low height in a suspension unit in order to maximize a customer space.

The background technology of the present disclosure is disclosed in Korean Patent Application Laid-Open No. 10-2022-0162460 (published on Dec. 8, 2022, and entitled 'Torsion Beam Axle Apparatus for Vehicle).

SUMMARY

Various embodiments are directed to a suspension apparatus for a vehicle, which is capable of designing a vehicle with a low height.

Various embodiments are also directed to a suspension apparatus for a vehicle, which is capable of ensuring an electric vehicle battery space and an interior space.

In an embodiment, a suspension apparatus for a vehicle includes: an axle carrier to which a wheel is rotatably coupled; a torsion beam axle having a trailing arm coupled to the axle carrier, the torsion beam axle being disposed in a width direction of a vehicle; a spring lower pad coupled to the axle carrier and having a bump stopper; a spring seated on the spring lower pad; and a shock absorber coupled to the axle carrier and disposed to be inclined toward a rear side of the vehicle.

The axle carrier may include: a flange on which the spring lower pad is seated; and a bracket positioned at one side of the flange and coupled to the shock absorber.

The shock absorber may include: a damper configured to be elastically deformable in an axial direction; a first pipe provided at first side of the damper and connected to the bracket; and a second pipe provided at a second side of the damper and connected to a vehicle body.

The second pipe may be positioned rearward of the first pipe.

The axial direction of the damper and a direction of a road surface load may be coincident with each other.

A length of the shock absorber may be smaller than a diameter of a tire.

The suspension apparatus may further include: a link part coupled to the axle carrier and disposed to be inclined toward a front side of the vehicle.

A first side of the link part may be coupled to the axle carrier, a second side of the link part may be disposed toward the front side of the vehicle, and the second side of the link part may be positioned to be higher than the first side of the link part.

The bump stopper may be integrated with the spring lower pad.

The bump stopper may be accommodated inside the spring.

According to the present disclosure, the multi-link torsion axle (MLTA) suspension-based inclined shock absorber for ensuring the installation space for the electric vehicle battery may be applied, and the bump stopper integrated with the spring lower pad may be applied, thereby minimizing an installation space at an upper end of the shock absorber.

In addition, according to the present disclosure, an installation space for the electric vehicle battery may be ensured, and thus a traveling distance may be increased. Further, the shock absorber is mounted so as not to deviate from the diameter of the tire, such that the vehicle having a low height may be designed, and an interior space of the vehicle may be ensured.

In addition, according to the present disclosure, the effect of the inclined shock absorber, which damps a road surface load, may be improved in consideration of the motion of the center of the wheel.

DETAILED DESCRIPTION

Figure 1:
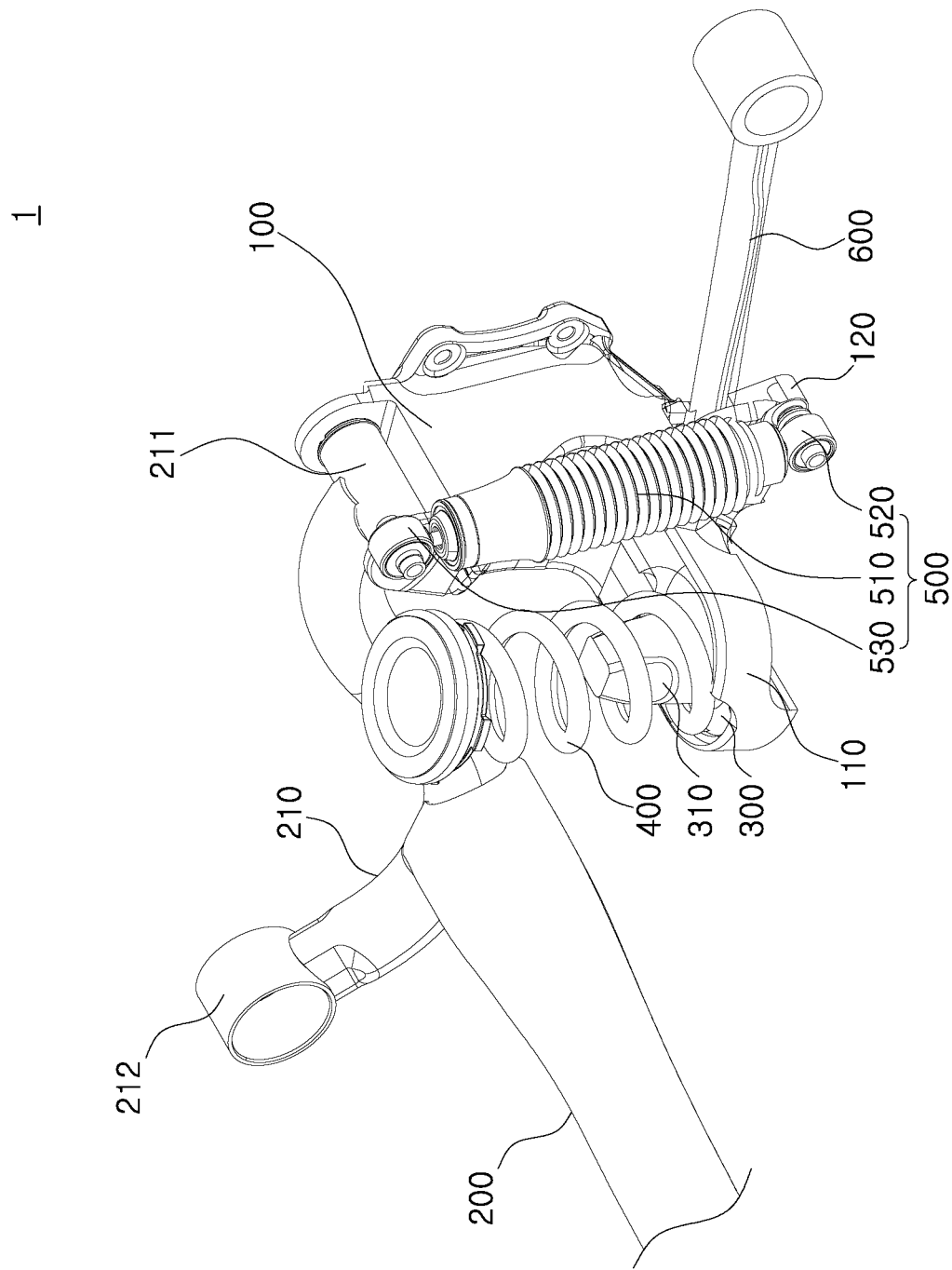
FIG. 1 is a perspective view illustrating a suspension apparatus for a vehicle according to an embodiment of the present disclosure.

Hereinafter, a suspension apparatus for a vehicle will be described below with reference to the accompanying drawings through various exemplary embodiments. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, the definition of the terms should be made based on the entire contents of the present specification.

Figure 2:
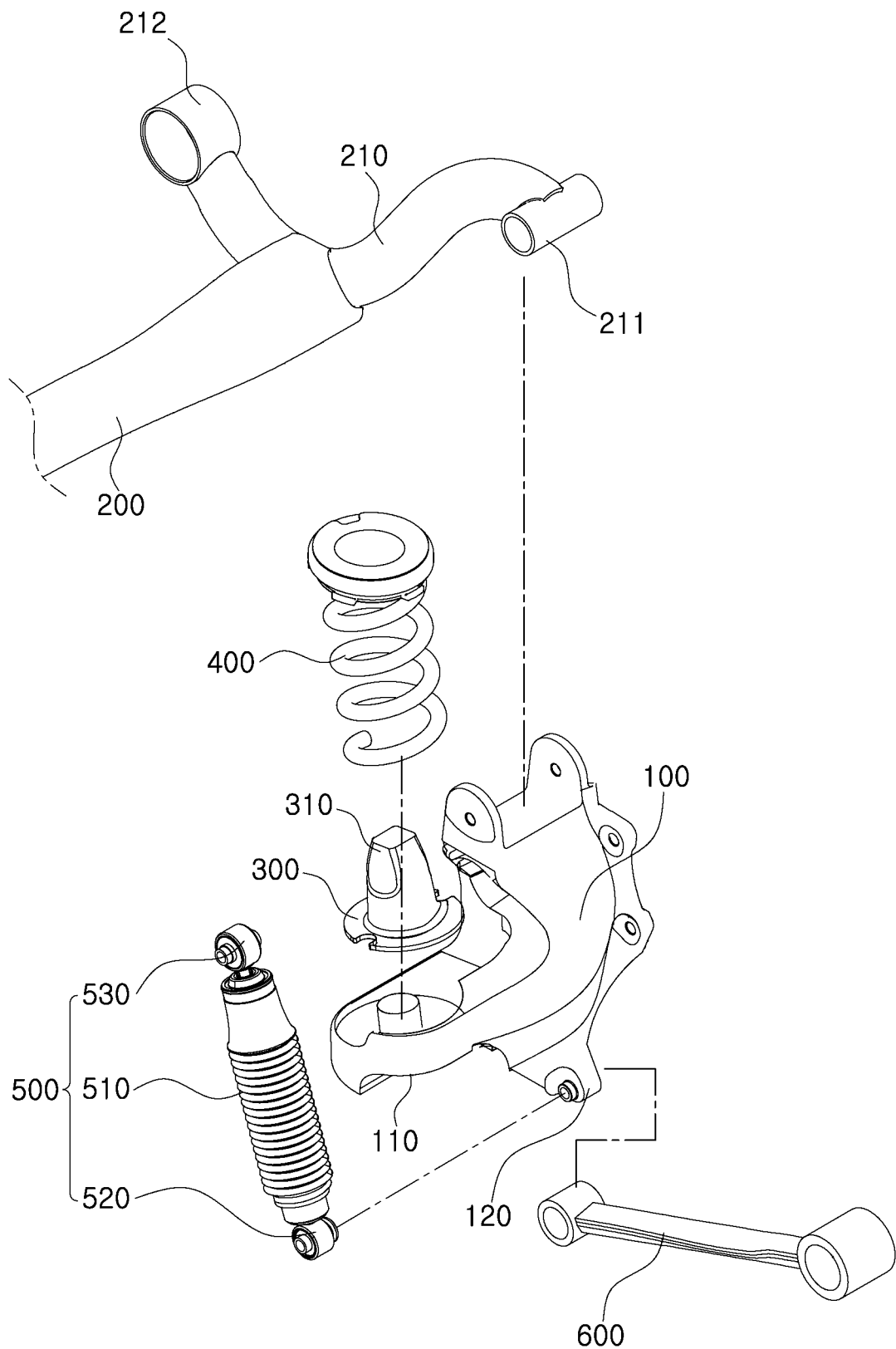
FIG. 2 is an exploded perspective view of FIG. 1.
Figure 3:
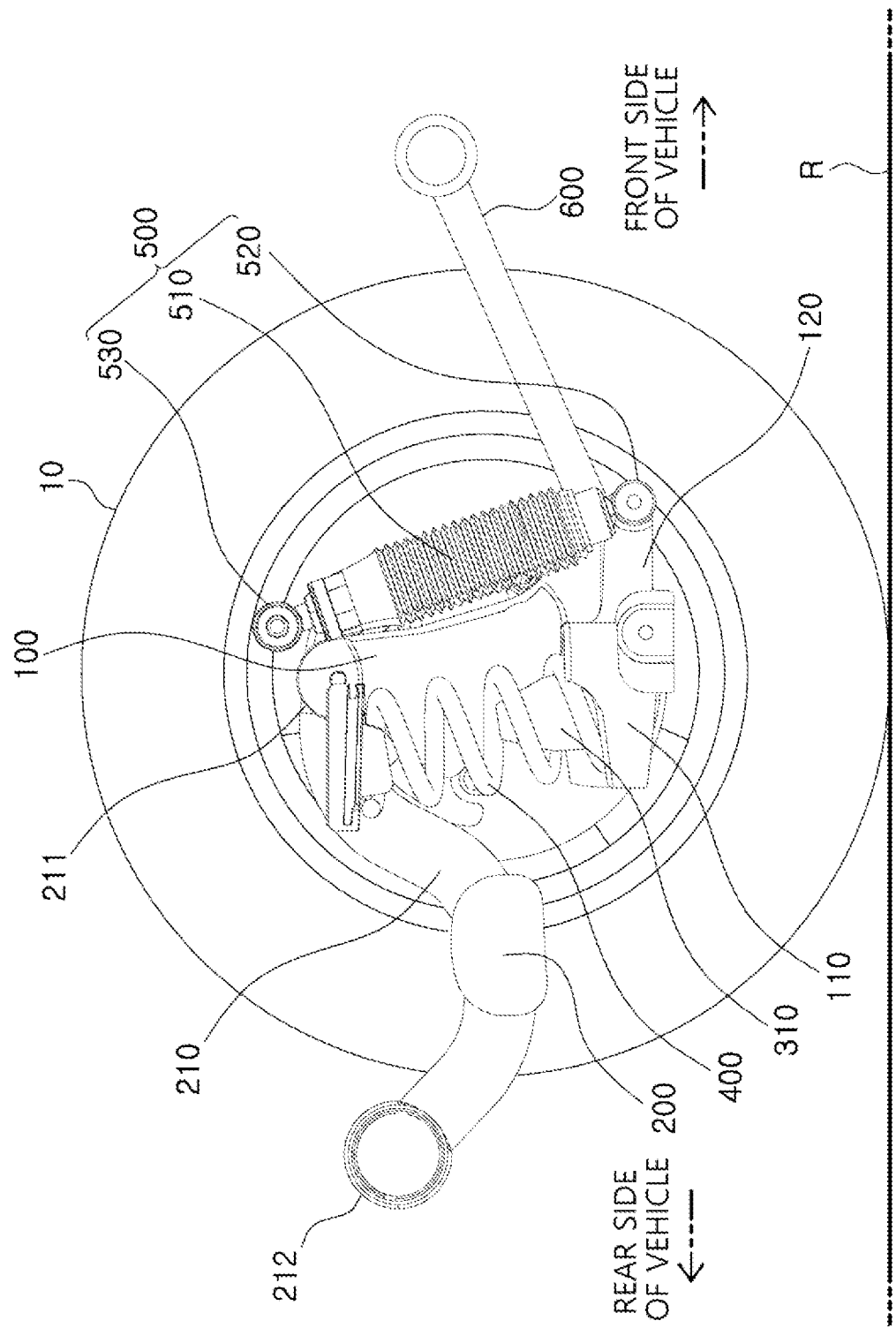
FIG. 3 is a side view illustrating a state in which a tire is mounted on the suspension apparatus for a vehicle according to the embodiment of the present disclosure.
Figure 4:
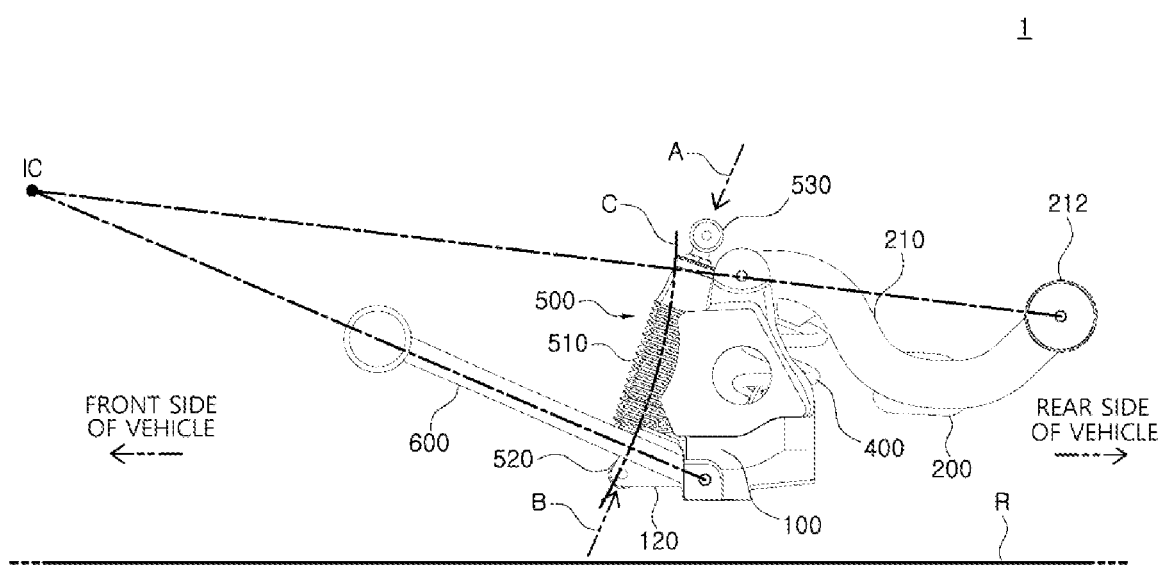
FIG. 4 is a side view illustrating a state in which a direction of a road surface load and an axial direction of a shock absorber are coincident with each other with respect to the suspension apparatus for a vehicle according to the embodiment of the present disclosure.

FIG. 1 is a perspective view illustrating a suspension apparatus for a vehicle according to an embodiment of the present disclosure, FIG. 2 is an exploded perspective view of FIG. 1, FIG. 3 is a side view illustrating a state in which a tire is mounted on the suspension apparatus for a vehicle according to the embodiment of the present disclosure, and FIG. 4 is a side view illustrating a state in which a direction of a road surface load and an axial direction of a shock absorber are coincident with each other with respect to the suspension apparatus for a vehicle according to the embodiment of the present disclosure.

With reference to FIGS. 1 to 4, a suspension apparatus 1 for a vehicle according to an embodiment of the present disclosure includes an axle carrier 100, a torsion beam axle 200, a spring lower pad 300, a spring 400, and a shock absorber 500. The suspension apparatus 1 will be described below in detail.

The axle carrier 100 is installed on a rear part of a vehicle. The axle carriers 100 are respectively disposed at two opposite sides of the vehicle based on a width direction of the vehicle. A wheel equipped with a tire 10 is rotatably coupled to the axle carrier 100. More specifically, a rear wheel may be rotatably coupled to an outer portion of the axle carrier 100 that is directed in the width direction of the vehicle.

The axle carrier 100 may include a flange 110 and a bracket 120. The spring lower pad 300 is seated on the flange 110. The flange 110 may protrude from an outer surface of the axle carrier 100. The flange 110 may be disposed in a direction toward the inside of the vehicle.

The shock absorber 500 is coupled to the bracket 120. The bracket 120 is positioned at one side of the flange 110. The bracket 120 may protrude from the outer surface of the axle carrier 100. The bracket 120 may be disposed in a direction toward the front side of the vehicle.

The torsion beam axle 200 is disposed in the width direction of the vehicle. The torsion beam axle 200 has trailing arms 210. The trailing arms 210 may be respectively provided at two opposite ends of the torsion beam axle 200 and disposed in a direction approximately orthogonal to the torsion beam axle 200. The trailing arm 210 may be integrated with the torsion beam axle 200.

The torsion beam axle 200 is coupled to the axle carrier 100 by means of the trailing arm 210. More specifically, a first coupling portion 211 may be provided at a first side of the trailing arm 210 and coupled to the axle carrier 100, and a second coupling portion 212 may be provided at a second side of the trailing arm 210 and coupled to the vehicle body.

The spring lower pad 300 is coupled to the axle carrier 100. More specifically, the spring lower pad 300 may be seated on an upper surface of the flange 110, and a rim of the spring lower pad 300 may be fastened to the flange 110 by bolting.

The spring lower pad 300 has a bump stopper 310. The bump stopper 310 may be formed on a central portion of an upper surface of the spring lower pad 300 and protrude from the upper surface of the spring lower pad 300. The bump stopper 310 may be integrated with the spring lower pad 300.

The spring 400 is seated on the spring lower pad 300. The spring 400 may be a coil spring elastically deformable in a length direction thereof. In a state in which the spring 400 stands vertically, a lower end of the spring 400 may be coupled to a rim of the upper surface of the spring lower pad 300. The bump stopper 310 is accommodated inside the spring 400.

An upper end of the spring 400 is coupled to the vehicle body, and the spring 400 may be elastically deformed in an upward/downward direction by vibration applied from a road surface R to the wheel and absorb vibration transmitted from the road surface R to the vehicle body through the wheel.

The shock absorber 500 is coupled to the axle carrier 100. The shock absorber 500 is disposed at an inclined angle with respect to the road surface R. More specifically, the shock absorber 500 is disposed to be inclined at a preset angle toward the rear side of the vehicle.

The shock absorber 500 may include a damper 510, a first pipe 520, and a second pipe 530.

The damper 510 may have a preset length and be elastically deformed in the axial direction.

The first pipe 520 is provided at a first side (a lower side based on FIG. 1) of the damper 510. The first pipe 520 may be formed in a hollow shape having an empty space. The first pipe 520 is connected to the bracket 120. A bushing may be mounted inside the first pipe 520.

The second pipe 530 is provided at a second side (an upper side based on FIG. 1) of the damper 510. The second pipe 530 may be formed in a hollow shape having an empty space. The second pipe 530 may be connected to the vehicle body. A bushing may be mounted inside the second pipe 530.

The second pipe 530 may be positioned rearward of the first pipe 520. More specifically, the first pipe 520 connected to the bracket 120 is disposed in the direction toward the front side of the vehicle, and the second pipe 530 connected to the vehicle body is disposed in the direction toward the rear side of the vehicle.

The suspension apparatus 1 for a vehicle according to the embodiment of the present disclosure may further include a link part 600. The link part 600 is coupled to the axle carrier 100.

More specifically, the link part 600 has a preset length, a first side of the link part 600 is coupled to an outer surface of the axle carrier 100 directed toward the front side of the vehicle, and a second side of the link part 600 is disposed toward the front side of the vehicle.

Because the second side of the link part 600 is positioned to be higher than the first side of the link part 600, the link part 600 may be disposed to be inclined upward at a preset angle toward the front side of the vehicle.

An axial direction A of the damper 510 and a direction B of a road surface load may be coincident with each other. More specifically, a damping direction of the shock absorber 500 and the direction B of the road surface load may be coincident with each other.

An instantaneous center IC is defined based on a center point of the second coupling portion 212 of the trailing arm 210 and a center point of the second side of the link part 600. More specifically, the instantaneous center IC is defined at a point at which an axial extension line of the link part 600 directed toward the front side of the vehicle meets an extension line that connects the second coupling portion 212 and the first coupling portion 211 of the trailing arm 210. The axle carrier 100 and the link part 600 are rotated about the instantaneous center IC.

Like the rotation of the link part 600, the shock absorber 500 mounted on the axle carrier 100 rotates about the instantaneous center IC, and a load of the road surface R is applied in a direction tangential to an instantaneous center rotation arc C based on the shock absorber.

When the inclination of the shock absorber 500 is set to be coincident with the direction B of the road surface load, the axial direction A of the shock absorber is coincident with the direction B of the road surface load. As a result, the shock absorber 500 may exhibit a significant damping effect.

As described above, the effect of damping the load of the road surface R may be improved by mounting kinematic components and the shock absorber 500 in consideration of a motion of a center of the wheel so that the axial direction is coincident with the direction B of the road surface load.

An overall length of the shock absorber 500 may be smaller than a diameter of the tire 10.

The bump stopper 310 and the spring lower pad 300 are integrated, and the spring lower pad 300 of the bump stopper 310 and the shock absorber 500 are separately disposed, such that the length of the shock absorber 500 may be reduced.

Therefore, because the inclined shock absorber 500 is mounted, a space disposed above the tire 10 is not occupied by the shock absorber 500, such that the vehicle may be designed to have a low height.

The position of the upper end of the shock absorber 500 is set so as not to deviate from the diameter of the tire 10 so that the shock absorber 500 may be mounted in the vehicle body instead of a wheel housing. Therefore, a shape for mounting the shock absorber 500 is not required in the wheel housing, such that an internal space of the wheel housing occupied by an upper side of the shock absorber 500 may be reduced.

Because the suspension apparatus 1 for a vehicle of the present disclosure does not occupy an upper end space of the tire 10, the space for mounting the shock absorber 500 in the wheel housing may be utilized. The upper space in the wheel housing, which corresponds to the space that has been occupied by the shock absorber 500, may be utilized, such that it is possible to design the vehicle having a low height and ensure the internal space of the wheel housing. This is advantageous in reducing costs and weight by eliminating a reinforcing material and eliminating the space corresponding to the part for mounting the shock absorber 500 in the wheel housing.

The suspension apparatus 1 for a vehicle according to the embodiment of the present disclosure may adopt the multi-link torsion axle (MLTA) suspension-based inclined shock absorber 500 for ensuring the installation space for the electric vehicle battery and adopt the bump stopper 310 integrated with the spring lower pad 300, thereby minimizing an installation space at an upper end of the shock absorber 500.

According to the suspension apparatus 1 for a vehicle according to the embodiment of the present disclosure, an installation space for the electric vehicle battery may be ensured, and thus a traveling distance may be increased. Further, the shock absorber 500 is mounted so as not to deviate from the diameter of the tire 10, such that the vehicle having a low height may be designed, and an interior space of the vehicle may be ensured.

According to the suspension apparatus 1 for a vehicle according to the embodiment of the present disclosure, the effect of the inclined shock absorber 500, which damps a road surface load, may be improved in consideration of the motion of the center of the wheel.

While the present disclosure has been described with reference to the embodiments depicted in the drawings, the embodiments are for illustrative purposes only, and those skilled in the art to which the present technology pertains will understand that various modifications of the embodiments and any other embodiments equivalent thereto are available. Accordingly, the true technical protection scope of the present disclosure should be determined by the appended claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension apparatus for a vehicle, the suspension apparatus comprising:
   an axle carrier to which a wheel is rotatably coupled;
   a torsion beam axle having a trailing arm coupled to the axle carrier, the torsion beam axle being disposed in a width direction of the vehicle;
   a spring lower pad coupled to the axle carrier and having a bump stopper;
   a spring seated on the spring lower pad; and
   a shock absorber coupled to the axle carrier and disposed to be inclined toward a rear side of the vehicle,
   wherein the spring is disposed in a space between the shock absorber and the torsion beam axle.

2. The suspension apparatus of claim 1, wherein the axle carrier comprises:
   a flange on which the spring lower pad is seated; and
   a bracket positioned at one side of the flange and coupled to the shock absorber.

3. The suspension apparatus of claim 2, wherein the shock absorber comprises:
   a damper configured to be elastically deformable in an axial direction of the damper;
   a first pipe provided at a first side of the damper and connected to the bracket; and
   a second pipe provided at a second side of the damper and connected to a vehicle body.

4. The suspension apparatus of claim 3, wherein the second pipe is positioned rearward of the first pipe with respect to a front side of the vehicle.

5. The suspension apparatus of claim 3, wherein the axial direction of the damper and a direction of a road surface load are coincident with each other.

6. The suspension apparatus of claim 1, wherein a length of the shock absorber is smaller than a diameter of a tire mounted on the suspension apparatus.

7. The suspension apparatus of claim 1, further comprising:
   a link part coupled to the axle carrier and disposed to be inclined toward a front side of the vehicle.

8. The suspension apparatus of claim 7, wherein a first side of the link part is coupled to the axle carrier, a second side of the link part is disposed toward the front side of the vehicle, and the second side of the link part is positioned to be higher than the first side of the link part.

9. The suspension apparatus of claim 1, wherein the bump stopper is integrated with the spring lower pad.

10. The suspension apparatus of claim 1, wherein the bump stopper is accommodated inside the spring.

* * * * *